(12) United States Patent
Launay et al.

(10) Patent No.: US 9,117,153 B2
(45) Date of Patent: Aug. 25, 2015

(54) DATA CARRIER HAVING A CONTACT PLATE WITH PRINTING THEREON

(75) Inventors: François Launay, Nanterre (FR); Denis Guerard, Nanterre (FR)

(73) Assignee: OBERTHUR TECHNOLOGIES, Levallois Perret (FR)

( * ) Notice: Subject to any disclaimer, the term of this patent is extended or adjusted under 35 U.S.C. 154(b) by 43 days.

(21) Appl. No.: 13/492,324

(22) Filed: Jun. 8, 2012

(65) Prior Publication Data

US 2013/0008968 A1 Jan. 10, 2013

(30) Foreign Application Priority Data

Jun. 10, 2011 (EP) .................................. 11305733

(51) Int. Cl.
| | | |
|---|---|---|
| *G06K 19/06* | (2006.01) | |
| *G06K 19/073* | (2006.01) | |
| *G06K 19/10* | (2006.01) | |

(52) U.S. Cl.
CPC .............. *G06K 19/073* (2013.01); *G06K 19/10* (2013.01); *Y10T 29/49204* (2015.01)

(58) Field of Classification Search
CPC ............................................... G06K 19/07754

USPC .......................................... 235/487, 488, 492
See application file for complete search history.

(56) References Cited

U.S. PATENT DOCUMENTS

| | | | |
|---|---|---|---|
| 5,581,065 A * | 12/1996 | Nishikawa et al. | 235/492 |
| 6,378,774 B1 | 4/2002 | Emori et al. | |
| 6,581,840 B2 * | 6/2003 | Takeda et al. | 235/488 |
| 6,641,049 B2 * | 11/2003 | Luu | 235/492 |
| 2001/0018984 A1 | 9/2001 | Takeda et al. | |
| 2002/0145049 A1 | 10/2002 | Lasch et al. | |
| 2008/0096317 A1 | 4/2008 | Middlekauff et al. | |
| 2009/0243278 A1 | 10/2009 | Camus et al. | |

FOREIGN PATENT DOCUMENTS

| | | |
|---|---|---|
| DE | 195 30 608 A1 | 2/1997 |
| FR | 2 828 953 A1 | 2/2003 |
| FR | 2 932 910 A1 | 12/2009 |
| WO | WO 03/102713 A2 | 12/2003 |

* cited by examiner

*Primary Examiner* — Daniel St Cyr
(74) *Attorney, Agent, or Firm* — Arent Fox LLP

(57) ABSTRACT

A data carrier having a main card body and a contact plate included on a surface of said main card body, wherein an area of the contact plate has a printed image thereon. In particular the image on the contact plate of the card is personalized and matches an image on the main card body so providing a further security feature for the data carrier.

14 Claims, 3 Drawing Sheets

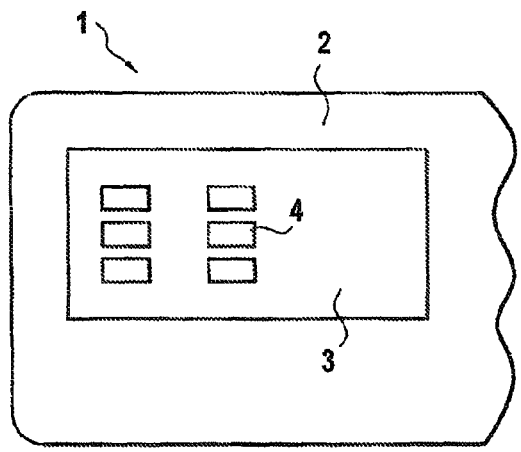
FIG.1a
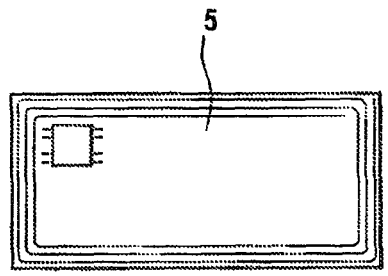
FIG.1b
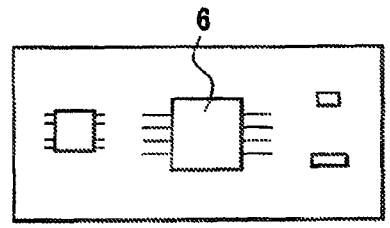
FIG.1c
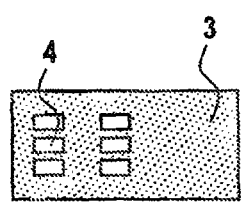
FIG.2
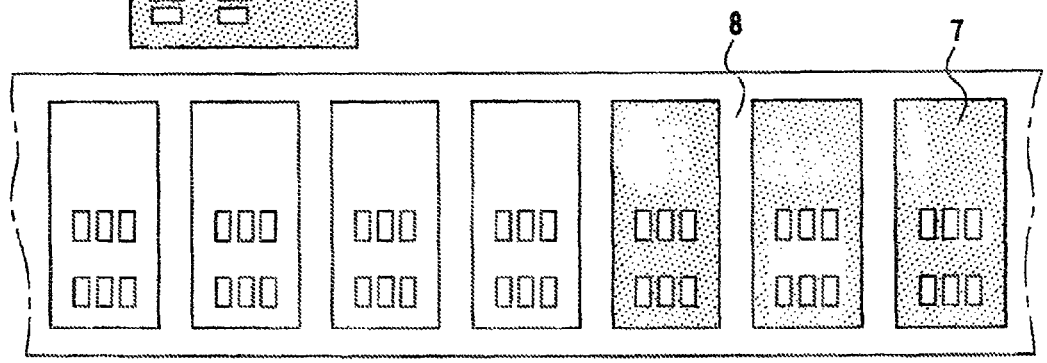

DATA CARRIER HAVING A CONTACT PLATE WITH PRINTING THEREON

FIELD OF THE INVENTION

The present invention relates to a data carrier having a contact plate with printing thereon.

BACKGROUND OF THE INVENTION

A data carrier having a contact plate is typically referred to as a smartcard. Such cards are generally of a standard credit card size and shape and there is a microchip embedded within the body of the card. The card provides not only memory capacity but also computational capacity as well because the chip is capable of processing data. The main body of the card is typically plastic or a paper plastic composite and there is a contact plate on the external surface of the card which is in electrical communication with the microchip that is contained in the body of the card.

The contact plate (sometimes referred to a contact area) is approximately 1 square centimeter (0.16 sq in), comprising several gold-plated contact pads. These pads provide electrical connectivity when inserted into a card reader. The contact plate is on one side of the card and when a card is inserted in a card reader in the correct orientation the electrical contacts of the card reader connect with the contacts on the card face. When the card is inserted in a Smart Card reader there is an electrical connection so data is read or written onto the card via the chip on the card. It is via these physical contact points that the transmission of commands, data and card status takes place. Such cards are typically used at retail point of sales or in banking environments.

Credit or Smart cards are often decorated with images, and these images can denote the provider of the card or the service provided by the card supplier. Also cards may bear advertising or pictures of the card holder, for example in the case of driving licenses or passports.

When including data on the surface of a card there are two main processes for including that data,—"Initialization" and "Personalization".

'Initialization' is a term used primarily to describe the process of programming the smart card chip with data that is the same for a batch of cards. An example of initialized data would be a file structure and secure key information for a specific application. The initialization process could also include the printing of information, such as a logo, that is common to all the cards in that batch.

'Personalization' is a general term used to describe the process of printing (or embossing) data on the surface of the card, encoding the magnetic stripe on the card, and programming data into the smart card chip. A more exact definition of personalization is doing the processes described above (printing, encoding, and programming) to a card with data specific to an individual cardholder.

In many cases, the initialization process and the personalization process are done together when the smart card is being issued.

When printing on a card, the printing is on the surface of the card but not on the contact plate to avoid reducing electrical contact between the card and a reader. To date the contact plate has been of a small size and so it does not detract from the overall appearance of the card. However cards are now being produced that have larger contact plates as more functions are included in the card, such as the inclusion of antenna in the contact plate itself. The increased size of the contact plate is more intrusive on the visual appearance of the card to the user. An added disadvantage is that there is less room on the card surface for printing advertising data or information. Furthermore, the contact plate may be more vulnerable to scratches.

The present invention seeks to overcome the problems associated with the prior art by providing a contact plate having a printed area thereon.

SUMMARY OF THE INVENTION

According to a first embodiment of the invention there is provided a data carrier having a main card body and a contact plate included on a surface of said main body, wherein an area of the contact plate has a printed image thereon.

Preferably the image is in a discrete area of the contact plate leaving one or more areas of the contact plate free from having a printed image thereon.

It is envisaged that the one or more areas are the areas where there are external contacts for the contact plate.

In a preferred arrangement the printed image is printed on a monochrome base layer on the contact plate.

Preferably the printed image is printed with a security ink.

In a preferred embodiment the data carrier is Smart Card, a bank card, a credit card, a debit card or a passport.

It is envisaged that the image corresponds to an image on the main card body of the data carrier.

The contact plate and the main card body of the data carrier are usually of different materials but they can both be of the same material, for example PET.

According to a further embodiment of the invention there is provided a method of manufacturing a data carrier wherein a contact plate is printed with an image and embedded in a main card body.

According to a yet a further embodiment of the invention there is provided a method of manufacturing a data carrier wherein a contact plate is embedded in a main card body and the contact plate is printed with an image.

Preferably, the contact plate and the main card body are printed with images in one printing pass.

The contact plate can first be coated with a base layer and then the image is printed onto the base layer.

It is envisaged that the prior to printing the base layer or the image, external contacts on the contact plate are masked.

A positive image may be printed on the contact plate, for example by LASER printing or a negative image is formed by LASER ablation.

Preferably the printing process is pad printing. However it is envisaged that other processes such as laser printing or D2T2 (Dye Diffusion Thermal Transfer) printing may be used.

BRIEF DESCRIPTION OF THE FIGURES

An embodiment of the invention will be described with reference to and as illustrated in the accompanying figures by way of example only, in which:

FIG. 1a shows: a Smart Card from the front and the position of external contacts on the contact plate FIG. 1b shows: an antenna positioned on a contact plate;

FIG. 1c shows: additional chips on a contact plate;

FIG. 2 shows: and series of contact plates on a strip with a base layer having been printed on contact plates;

DETAILED DESCRIPTION OF EMBODIMENTS OF THE INVENTION

Figure 3A:
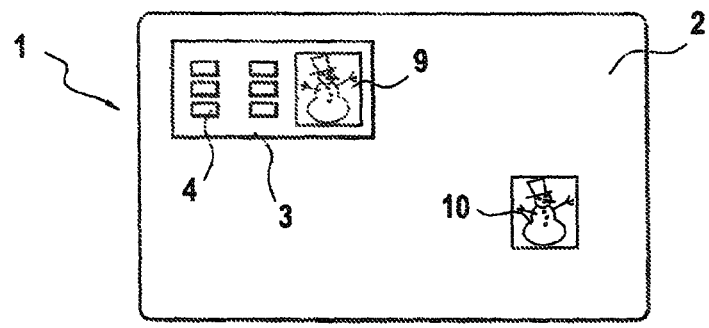
FIG. 3a shows: a data carrier having matching images.

A data carrier is shown in FIG. 1a generally as 1 (partial view) and the data carrier has a main body 2 (partially shown), which typically is a plastic credit card although it is envisaged that data carriers such as identification cards, driving licenses or passports may be the data carrier. The data carrier has a contact plate on a surface which is shown as 3 and this contact plate has external contacts 4 which are a set size to comply with the relevant standards set by the ISO (International Organization for Standards). The external contacts are shown as two parallel rows, each having three or four contacts (although more or less contacts can be present). The external contacts should be of a particular size and at a particular location on a card so that they can connect to contacts in a receiving device. If a contact plate is of a large size then when the contact plate is embedded in the body of the data carrier it may detract from the appearance of the data carrier when it is printed. FIG. 1b shows a contact plate having an antenna 5 around the periphery of the contact plate and this antenna is ideally a distance from the external contacts so there is no interference. If more functions are needed for the card it may have additional chips 6 as shown in FIG. 1c, which means that the contact plate becomes bigger to accommodate these different entities. Furthermore if a contact plate is fully metallized to produce a good contact, then the contact plates become very expensive. Typically the metals that are used include ruthenium, palladium or gold, which are costly materials.

It has been found that it is possible to metalize only the area needed for ISO external contacts and decorate the remaining surface with screen printing as shown in FIG. 2. The screen printing area, which forma a base layer 7 extends over the main area of the contact plate 3. For printing, it is necessary to have an ink that can be laid down on the contact plate, which is typically a predominantly metal surface so there is adequate contact between the contact plate and the ink in order for it not to degrade or wear off the contact plate through use. The contact plates are provided on a carrier strip 8 and they can be passed through a printer so that the area around the external contacts is covered with a layer of ink or polymer that is pigmented. The external contacts are not printed on and remain visible. The external contacts can be masked or covered with a material that prevents ink attaching to the external contacts.

It has been found that by using a colored uniform background as support for the contacts, a surface on which dedicated artwork can be applied to the card can be provided. The uniform background is typically a white or black layer of PET. The uniform layer can be laid down before or after the contact plate has been embedded in the card body, which is typically a plastic card. The use of a background can help to create an even surface on the contact plate and also to create an even print tone on the contact plate.

The card is personalized as shown in FIG. 3. This is done by printing a dedicated image on the card which may be a unique artwork for that card or artwork that is limited to a particular print run. A number of printing techniques can be used, for example, Pad printing, Dye Diffusion Thermal Transfer (D2T2) printing, ink jet or LASER.

In pad printing an indirect offset (gravure) printing process is used that involves an image being transferred from the printing plate (cliché) via a silicone pad onto a substrate. Physical changes within the ink film both on the cliché and on the pad allow it to leave the etched image area in favor of adhering to the pad, and to subsequently release from the pad in favor of adhering to the substrate. In the process, a sealed ink cup (an inverted cup containing ink) sits over the etched artwork area of the printing plate, covering the image and filling it with ink. The sealed ink cup moves away from the etched artwork area, taking all. excess ink and exposing the etched image, which is filled with ink. The top layer of ink becomes tacky as soon as it is exposed to the air; that is how the ink adheres to the transfer pad and later to the substrate. The transfer pad presses down onto the printing plate momentarily. As the pad is compressed, it pushes air outward and causes the ink to lift (transfer) from the etched artwork area onto the pad. As the transfer pad lifts away, the tacky ink film inside the etched artwork area is picked up on the pad. A small amount of ink remains in the printing plate. As the transfer pad moves forward, the ink cup also moves to cover the etched artwork area on the printing plate. The ink cup again fills the etched artwork image on the plate with ink in preparation for the next cycle. The transfer pad compresses down onto the substrate, transferring the ink layer picked up from the printing plate to the substrate surface. Then, it lifts off the substrate and returns to the home position, thus completing one print cycle. This process may be carried out for printing on the contact plate in a localised area, leaving the external contacts unprinted. It may also be carried out on an area of the card body. Typically with this type of printing batches of cards can be printed and these can be matched with batches of printed contact plates.

The D2T2 (Dye Diffusion Thermal Transfer) printing system involves the use of a sublimation dye on an ink ribbon which is transferred and spread into a substrate by heat from a thermal head in the printing equipment. The optical density of the image depends on the glass transition temperature (Tg) of the material that forms the substrate so, adjustment of the optical density and stick-slip behavior is important when printing on a metal contact plate.

LASER printing being computer controlled always for individualised artwork to be printed on the contact plate and on the card body.

LASER printing can be used in a direct mode (burning of contact plate surface) or it be used indirectly where there is printing of a background ink layer, for example by pad printing and then subsequently performing a local ablation of the ink layer to create a number or an artwork both on the contact plate and on the card support.

It is envisaged that selected specific inks can be used to provide a further security aspect to a card. Inks can now perform a multitude of functions beyond just security. They can be impossible to copy, only readable by machine or reactive to changes in temperature or atmosphere and these inks include security inks, optical variable inks or UV and IR inks.

Figure 3B:
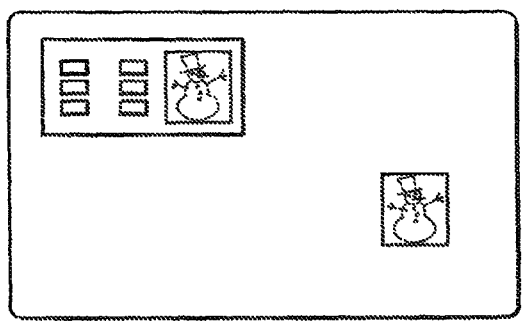
FIG. 3b shows: images for one batch of cards.
Figure 3C:
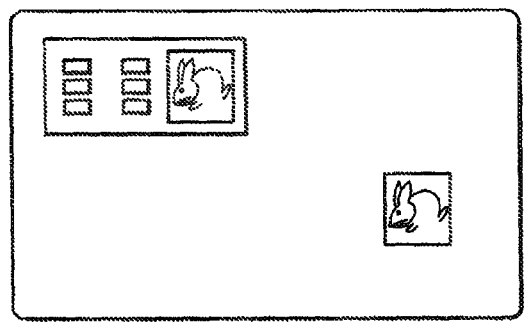
FIG. 3c shows: images on another batch of cards.
Figure 3D:
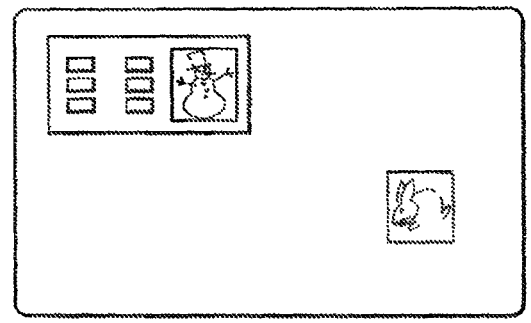
FIG. 3d shows: a fraudulent card having non matching images.

FIG. 3a shows a data carrier 1 card having the same artwork (9, 10) on both the contact plate (and the card body. FIGS. 3b and 3c show two batches of genuine cards each with personalized matching artwork on each card. FIG. 3d shows a fraudulent card where a contact plate from the batch shown in FIG. 3d has been included in a card body of the batch shown in FIG. 3C. If the same artwork is printed on the contact plate and on the card it is thus possible to link the card and the module so that if a module is removed from a card to be re-integrated in another card for fraud purposes, it can be easily and immediately detected. Additionally, this is a way to give traceability of which printed batch of cards a particular card relates to so providing a way of identifying when and from where the card was manufactured or issued.

Figure 4:
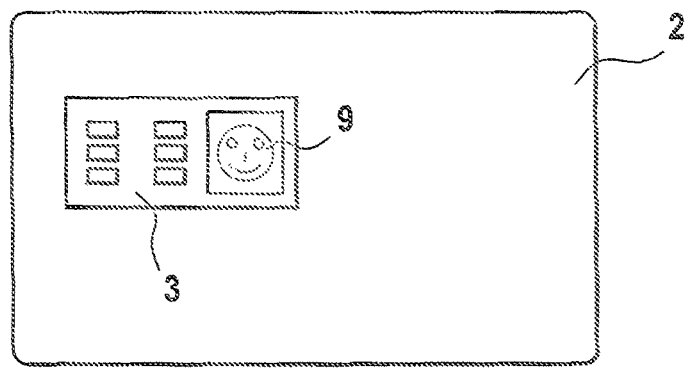
FIG. 4 shows: a card that has been personalization by LASER ablation.

FIG. 4 shows a card that has been personalization by LASER ablation where the contact plate 3 is first printed with a background layer, for example by pad printing or by silk-screen printing. LASER ablation is then used to remove the printed ink which allows areas of the contact plate to be revealed as the logo that is required.

Figure 5:
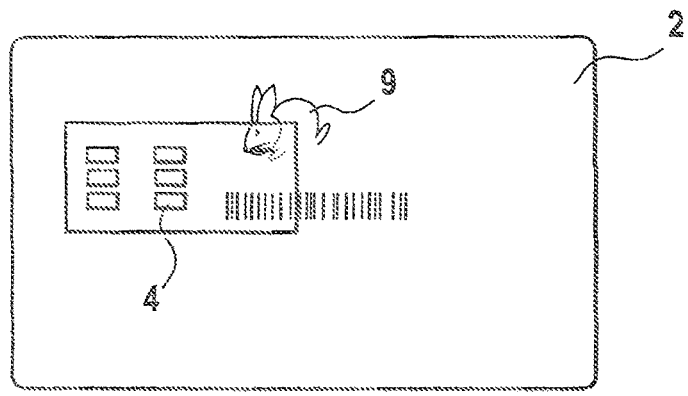
FIG. 5 shows: another embodiment where the printed image is printed partially on the contact plate and partially on the card body.

FIG. 5 shows another embodiment where the printed image 9 is printed partially on the contact plate 3 and partially on the card body 2, so the image in effect is provided in two portions. This has the advantage that it is not possible to remove the contact plate and put it in another card body as to complete the image, the two halves of the printed image 9 must match. This matching of the image provides a further security feature for making sure that the contact plate 3 is for a particular card body 2.

Therefore it can be seen that having the ability to print discrete areas on a contact plate while still leaving the external contacts exposed allows for an improved security feature so that it is difficult for fraudsters to remove contact plates from cards and use them in a card body that is not related to the contact plate.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described. Furthermore where individual embodiments are discussed, the invention is intended to cover combinations of those embodiments as well.

The invention claimed is:

1. A data carrier having a main card body and a contact plate embedded in the main card body, the contact plate being metalized on a first area to produce external contacts on the first area of the contact plate, wherein a second area of the contact plate has a printed image thereon, the printed image being in a discrete area of the contact plate distinct from the external contacts,
   the external contacts being arranged in compliance with International Organization for Standards (ISO) standards in two parallel rows so that the external contacts connect to contacts on a receiving device, the two parallel rows being spaced apart from each other,
   the first area being metalized only in an area for the external contacts compliant with the ISO standards to connect to the contacts of the receiving device.

2. The data carrier according to claim 1, wherein the one or more areas comprise areas having external contacts for the contact plate.

3. The data carrier according to claim 1, wherein the printed image is printed on a monochrome base layer on the contact plate.

4. The data carrier according to claim 1, wherein the printed image is printed with an ink selected from the group consisting of inks readable by a machine, inks reactive to changes in temperature or atmosphere, and inks reactive to UV or IR.

5. The data carrier according to claim 1, wherein the data carrier is a Smart Card, a bank card, a credit card, a debit card or a passport.

6. The data carrier according to claim 1, wherein the printed image corresponds to a printed image on the main card body of the data carrier.

7. The data carrier according to claim 1, wherein the printed image is partially on the contact plate and partially on the main card body of the data carrier.

8. The data carrier according to claim 1, wherein the contact plate and the main card body of the data carrier are of different materials.

9. A method of manufacturing a data carrier wherein a contact plate is printed with an image and embedded in a main card body of the data carrier, the contact plate being metalized on an area to produce external contacts on the area of the contact plate, the printed image being in a discrete area of the contact plate distinct from the external contacts,
   the external contacts being arranged in compliance with International Organization for Standards (ISO) standards in two parallel rows so that the external contacts connect to contacts on a receiving device, the two parallel rows being spaced apart from each other,
   the first area being metalized only in an area for the external contacts compliant with the ISO standards to connect to the contacts of the receiving device.

10. The method according to claim 9, wherein the contact plate is first coated with a base layer and then the image is printed onto the base layer.

11. The method according to claim 10, wherein, prior to printing the base layer, external contacts on the contact plate are masked.

12. The method according to claim 9, wherein the image is printed by a printing process selected from the group consisting of: a direct LASER beam application on the contact plate, local LASER ablation of a base layer pre-deposited on the contact plate, laser printing, and Dye Diffusion Thermal Transfer.

13. A method of manufacturing a data carrier wherein a contact plate is embedded in a main card body of the data carrier and the contact plate is printed with an image after embedding, the contact plate being metalized on an area to produce external contacts on the area of the contact plate, the image being in a discrete area of the contact plate distinct from the external contacts,
   the external contacts being arranged in compliance with International Organization for Standards (ISO) standards in two parallel rows so that the external contacts connect to contacts on a receiving device, the two parallel rows being spaced apart from each other,
   the first area being metalized only in an area for the external contacts compliant with the ISO standards to connect to the contacts of the receiving device.

14. The method according to claim 13, wherein the contact plate and the main card body are printed with images in one printing pass.

* * * * *